Patented June 27, 1944

2,352,484

UNITED STATES PATENT OFFICE 2,352,484

CATALYTIC TREATMENT OF HYDROCARBONS

Elmer R. Kanhofer, Riverside, Ill., assignor to Universal Oil Products Company, Chicago, Ill., a corporation of Delaware No Drawing. Application March 31, 1943, Serial No. 481,278

10 Claims. (Cl. 196—52)

This application is a continuation-in-part of my co-pending application Serial #347,753, filed July 26, 1940.

This invention relates to a process for the conversion of hydrocarbons such as petroleum fractions and hydrocarbon oils generally in the presence of finely divided catalysts to produce substantial yields of hydrocarbons distilling within the gasoline boiling range and having high antiknock value. The process may be applied to conversion involving low boiling as well as higher boiling hydrocarbons whether they are of natural or synthetic origin, or are produced as, for example, from primary distillates resulting from the destructive distillation of hydrocarbon-containing materials such as coals, lignites and shales.

The present invention provides a process for converting hydrocarbon oil in a relatively simple manner while in the presence of catalyst powder. In the more conventional catalytic processes hydrocarbon oils are converted while in contact with granular catalysts disposed as beds in reaction chambers. A plurality of reaction chambers are provided so as to permit continuous operation, one or more chambers being in process while one or more are in regeneration. When cracking with catalyst powder, only a single reaction chamber may be employed and the catalyst may be regenerated outside the reaction zone. The invention is further characterized by the use of catalysts specially adapted to the process. These catalysts are produced synthetically and in a finely divided condition. They are more effective than synthetic catalysts of similar composition which may be prepared in a gel conditon, and subsequently dried and reduced to the powdered form.

In a broad aspect the present invention comprises a process for the conversion of hydrocarbon oils or hydrocarbon oil fractions while in contact with synthetic cracking catalyst powders of the silica-metal oxide type which have been prepared by utilizing silica precipitated from alkali metal silicate solutions in the presence of added alkylene polyamines which favor the separation of the silica in a finely divided condition rather than as a sol or gel.

In one specific embodiment the present invention comprises admixing a synthetic cracking catalyst powder, which has been precipitated in a finely divided condition in the presence of an alkylene polyamine, with hydrocarbon oil, and subjecting the admixture to conditions of time, temperature and pressure adequate to produce large yields of high antiknock gasoline.

In a further specific embodiment the invention comprises subjecting hydrocarbons to contact with a silica-metal oxide composite produced by adding an acid to a solution of an alkali metal silicate containing an alkylene polyamine to precipitate finely divided hydrated silica, combining said hydrated silica with a solution of a metal salt, adding an alkaline reagent to precipitate a hydrated oxide of said metal, separating a composite of silica and hydrated metal oxide, washing said last named composite to remove soluble compounds therefrom and heating to remove water and produce said catalyst.

In a further embodiment of the invention gasoline boiling range hydrocarbon fractions, having relatively low antiknock value, are treated for improving their antiknock value by contacting them at elevated temperatures with the types of finely divided catalysts above specified.

In a further embodiment of the invention olefin-containing gasolines produced by thermal or thermal-catalytic cracking processes may be treated to increase their saturation by contacting them with the types of finely divided catalysts specified.

According to one aspect of the present invention, hydrocarbon oils preferably those of a distillate character and vaporizable without substantial decomposition, are catalytically cracked in the presence of composite hydrous oxide catalysts which are precipitated in a very finely divided form and maintained in a fine state of subdivision for processing with the hydrocarbon oil. The hydrous oxides employed are preferably composites of hydrated silica with alumina or zirconia, the hydrated silicon dioxide constituting the major proportion of the catalyst composition while the remaining components are present in minor proportions.

The catalyst is prepared in a finely divided rather than in the usual gel condition by precipitating, for example, a hydrated silica under definitely controlled conditions in the presence of an alkylene polyamine. A relatively highly dispersed precipitate nearly of colloidal dimensions is thus produced which can be composited with the remaining hydrated oxides to yield a catalyst which is more effective in the present process than catalysts of corresponding composition prepared from gels or gelatinous precipitates.

In accordance with the present invention hydrocarbon oils are subjected to conversion at elevated temperatures in the presence of finely divided composite catalysts which are prepared by precipitating hydrated silica from alkali metal silicates in the presence of alkylene polyamines and the silica then composited with other hydrous oxides such as, for example, alumina and/or zirconia. The hydrous silicon oxides are precipitated as very finely divided particles which tend to remain in suspension for prolonged periods of time as contrasted with the preparation of these composites in the form of gelatinous precipitates or sols which set into gels upon prolonged standing.

The preparation of the preferred catalysts is accomplished, for example, by the precipitation of the hydrated silica under definitely controlled conditions in the presence of a suitable added alkylene polyamine. Various alkylene polyamines have similar although not equivalent effects when properly used so that the invention should not be construed as limited to the use of any one compound included in this general group. The invention resides in the use of catalytic materials prepared by forming not jellies or gelatinous precipitates as is the practice in the prior art, but very finely divided and relatively highly dispersed precipitates approaching colloidal dimensions. The finely divided precipitates may vary in their degrees of dispersion depending upon the specific conditions employed in their manufacture, but precipitates highly suitable for use as powdered catalysts, for example, have been prepared where the particles are so small and of such a nature as to exhibit little or no tendency to settle out of suspension except on prolonged standing. It has been found in some cases that the formation of finely divided material is not only a function of the nature and amount of the added alkylene polyamines and the time at which they are added relative to the reactants, but also is dependent upon the dilution of the reactants and the manner in which they are mixed, as will be hereinafter illustrated. Various procedures may be utilized not only in forming the finely divided hydrated oxides, but also in the manner of compositing them.

Compounds which have been found to be effective in promoting the formation of finely divided catalytic precipitates of silica or silica-alumina composites may be broadly classified as alkylene polyamines. The simplest compound in this group is ethylene diamine which has the formula

NH$_2$CH$_2$CH$_2$NH$_2$

Other compounds in this group are diethylene triamine having the formula

NH$_2$CH$_2$CH$_2$NHCH$_2$CH$_2$NH$_2$ and triethylenetetra-amine having the formula

NH$_2$CH$_2$CH$_2$NHCH$_2$CH$_2$NHCH$_2$CH$_2$NH$_2$

These compounds are usually made by the reaction between ethylene or other alkylene dibromides and ammonia, which type of reaction produces various alkylene polyamines which can be separated into individual compounds by fractional distillation. Since the various compounds in this group are characterized by varying solubility and varying effectiveness in promoting the formation of silica and silica-alumina type composites in finely divided condition on precipitation from solution, it is obvious that they are not to be considered as exactly equivalent in their action in favoring the production of finely divided catalyst composites suitable for accelerating particular types of hydrocarbon conversions. It is not known whether the compounds themselves or their acid addition product such as, for example, their hydrochlorides are the dispersing or peptizing agents in the catalyst manufacturing process. When, for example, silica is precipitated by the acidification of a sodium silicate solution in the presence of one of the compounds, a certain amount of acid addition compound such as, for example, ethylene diamine hydrochloride will be formed and good results have been obtained, as will be shown in later examples, if this hydrochloride is originally present in the sodium silicate solution. If the precipitation of the silica or the silica-alumina composites is brought about by the use of other acids such as, for example, sulfuric, nitric, or phosphoric acids, the addition compounds will be those formed by the interaction of the alkylene polyamine and the particular acid used.

The amounts of the alkylene polyamines which are necessary for insuring the production of finely divided silica or silica-alumina type composites for use in the present process will also be somewhat variable. In the case of a commercial water glass solution at about a 10 to 1 dilution, ethylene diamine can be present in an amount of about 0.5% by weight of the solution without forming any precipitate. When hydrochloric acid is added slowly to such a solution, a powdered hydrated silica is precipitated. When greater concentrations of the amine are present in such diluted water glass solutions, some powder is precipitated prior to the addition of the acid. At lower concentrations of the amine a silica gel rather than a finely divided silica is formed on the addition of the acid.

Tests have been made in which a water glass of about 5 to 1 dilution and hydrochloric acid of about 1 to 1 dilution were added concurrently to a solution of ethylene diamine-hydrochloride which was maintained at a constant pH value by controlling the rate of acid addition. These tests showed that pH values of about 3 to 4 do not favor the complete precipitation of hydrated silica as a powder. When incompletely precipitated mixtures formed at a pH value of 3 were brought to a pH value of 6 by the slow addition of ammonium hydroxide, the hydrated silica was completely precipitated in finely divided condition. Complete precipitation of the hydrated silica in finely divided condition was also accomplished when the water glass and acid were added concurrently to the solution of the amine at pH value of 6 to 7.

Various methods may be employed in compositing the hydrous oxides of silica and alumina and/or zirconia depending upon the particular use to which the product is to be put and the degree of purity desired in the final product. According to one general method, a finely divided hydrated silica may be prepared by diluting an alkali metal silicate such as a commercial grade of water glass with approximately 3 to 10 times its volume of a solution wherein an amount of an alkylene polyamine is disposed in the proper concentration prior to the precipitation of the hydrated silica. According to this method, as a specific example, a minimum amount of the alkylene polyamine may be used for a particular dilution and kind of water glass employed and acid gradually added while thoroughly agitating.

in an amount sufficient to precipitate a finely divided hydrated silica. The rate of addition of the acid should not be rapid however. It is necessary even where the proper amount of the added substance is present to thoroughly mix the reactants in streams or by agitation and employ times of .5 to 20 minutes or more depending upon size of batch, mixing conditions, etc.

As a specific example of compositing hydrous oxides the finely divided hydrated silica prepared in this manner may be admixed, while still in suspension, with a separately precipitated hydrated oxide, or the suspension of hydrated silica may be mixed with a solution of a salt of the metal from which a hydrated oxide is to be precipitated in the presence of the finely divided hydrated silica and an alkaline precipitant added to precipitate the hydrous oxide. Variations of this procedure may be employed whereby by way of example the primary hydrated silica is filtered and separated from the salt solution, washed and purified if desired and reslurried or otherwise composited with the remaining hydrous oxide component. According to this latter method for example, a finely divided hydrated silica may be precipitated, filtered and washed to remove alkali metal impurities by methods which will be subsequently described, and the purified hydrated silica then dispersed in the solution containing aluminum chloride, for example, and hydrated alumina precipitated in the presence of the finely divided hydrated silica by the addition of ammonium hydroxide.

After precipitating the finely divided hydrated silica as above described, unless it is to be filtered, washed and/or purified as alternatively indicated, it is composited with the remaining hydrous oxides (which may have been separately precipitated) or it is mixed with a solution of a salt of the metal of the hydrated oxide to be subsequently precipitated on its surfaces and in its pores. A basic reagent is then added whereby hydrous oxide such as precipitated alumina and/or precipitated zirconia, for example, are deposited. The basic reagent employed may be an alkali metal hydroxide, ammonium hydroxide or alkaline precipitants generally, and the amount added may be such that the pH is not far removed from the neutral point in the case of silica, alumina and/or zirconia composites.

According to still another procedure a solution of a soluble silicon compound may be mixed with a solution of a metal compound whose hydrous oxide is to be co-precipitated with a hydrated silica while the added alkylene polyamine is in admixture with either or both of the solutions. The hydrogen ion concentration of the reactants or reaction mixture is adjusted according to the proportions and character of the added amine. In this case also the finely divided granular precipitate may be formed as a fine suspension distributed through the liquid when proper conditions of concentration, mixing, dilution and pH conditions are observed. Various co-precipitation procedures are possible depending upon whether silicates are used or silicon salts. The finely divided, highly dispersed suspensions produced according to the above procedures are entirely different in appearance and physical condition from gelatinous precipitates of corresponding concentrations. The gelatinous precipitates are highly hydrated and very voluminous and may sometimes constitute a relatively thick slurry when precipitated under conditions of dilution and proportion of reactants which yield fluid suspensions in the process of the present invention.

The hydrous oxides composited with the finely divided, highly dispersed hydrated silica may be those of aluminum, zirconium, vanadium, thorium, chromium, molybdenum and numerous other metals yielding composites with hydrated silica having catalytic and adsorbent properties. As a result of the procedures employed, the hydrous oxides are very intimately intermingled with or precipitated in the presence of specially prepared, hydrated silica and disposed in its pores and on its surfaces in the finished catalyst. Various proportions of the hydrous oxides may be employed, the more frequent practice being to employ minor amounts of added hydrous oxides and major proportions of the hydrated silica. Thus in the preparation of highly effective silica-alumina catalysts, approximately 5 to 30 percent of hydrated alumina is preferably compoisted with the hydrated silicon dioxide. Smaller and larger proportions of alumina may also be utilized but generally speaking without the same catalytic effectiveness. Similarly, hydrated zirconia or other hydrous oxides may be employed or mixtures of these hydrous oxides, good results having been obtained in cracking reactions where alumina and zirconia, for example, have been composited with hydrated silicon dioxide. Highly suitable catalysts have been produced by compositing several mols of alumina and 5 to 10 mols of zirconia with 100 mols of the specially prepared silicon dioxide.

Suspensions of the precipitates or composites are directed to any convenient form of filtration apparatus such as a filter press or centrifugal filter for example, wherein the great bulk of the liquid is removed and a filter cake formed which may be washed if desired with comparative ease as contrasted with gelatinous precipitates or gels. It has been found desirable when producing the catalyst in a highly active and stable form to carefully wash the precipitates and/or composites free from salts and particularly alkali metal impurities. This may be accomplished by various forms of washing treatment such as more or less prolonged washing with various acidic and saline solutions. Water acidulated with strong acids for example, or solutions of strongly acid salts of ammonium or metals corresponding to those of the added metal oxides for example, may be suitable and the material may be purified before or after drying treatment. These purification washes may be carried out as indicated above prior to compositing of the specially prepared hydrated silica with the remaining hydrous oxides. The composite material may be finally dried at temperatures of approximately 200–250° F., more or less.

The products from the foregoing typical catalyst manufacturing operations are very finely divided as compared with products of similar composition prepared from gels by conventional methods as illustrated by the fact that aqueous suspensions of the material in preparation are very slow in settling out. Some preparations have particular sizes of the order of 5 to 20 microns and if formed and shaped produce contact masses which are approximately one-half as dense the corresponding formed masses produced from gels. If desired, the powder may be formed into shaped particles by the conventional consolidating and shaping processes such as pilling and briquetting or the material may be extruded. Various lubricants may be employed to facilitate pelleting such as graphite, hydrogenated vegetable oil, certain metal palmitates and stearates, etc. and organic materials such as flour, starch, etc.

In accordance with the present invention, it has been found that finely divided powders prepared by the above described procedures are highly suitable as catalysts to be suspended in a stream of oil and processed under suitable conditions of temperature, pressure and contact time to carry out hydrocarbon conversion reactions, to produce large yields of high antiknock gasoline. In the cracking of a heavy oil where in some cases it may not be desirable to recover the catalyst, it may not be necessary to purify or even dry the powdered product. On the other hand, in many operations it will be desirable to use a highly stable form of the catalyst which is separated from residual and carbonaceous deposits and repeatedly regenerated. The powdered catalyst may then be separated from the oil by various procedures and the separated catalyst regenerated by removing hydrocarbonaceous deposits as by solvent treatment or heating in the presence of air whereupon it is used again either alone or in admixture with fresh catalyst in suspension in the hydrocarbon oil processed. The usefulness of the present types of catalysts, however, is not restricted to their use as powders since they may be formed into particles and disposed in beds in catalyst reactors and preheated vapors passed therethrough at reaction temperature. In this type of apparatus the catalyst is intermittently regenerated by heated oxidizing gas, for example, whereby carbonaceous deposits are removed.

Various types of hydrocarbon conversion reactions take place in the presence of the powdered catalyst depending partly upon the nature of the hydrocarbon oil processed. These reactions may include carbon to carbon cleavage, isomerization, cyclization, dehydrogenation, hydrogenation, and desulfurization reactions. In the case of higher boiling hydrocarbons, for example, there may be a cleavage of carbon to carbon bonds and isomerization reactions may also occur whereby the lower boiling hydrocarbons formed tend to become more highly branched. Also hydroaromatic hydrocarbons present in the oil undergoing decomposition or formed therein by cyclization of olefins may undergo dehydrogenation to form aromatic hydrocarbons and hydrogen liberated in these reactions may combine with olefins present during reaction to form paraffinic hydrocarbons. The latter reactions tend to occur at the lower temperatures given in the range of operating conditions whereas more unsaturated hydrocarbons, particularly olefins, are produced in large proportions at the higher temperatures employed. The hydrocarbons generally are of a more branched chain structure than is produced in thermal cracking treatment. The temperatures employed may be within the approximate range of 700–1150° F. more or less, and the pressures employed may range from approximately atmospheric to 300 pounds or more per square inch.

The following specific example is given to illustrate a specific application of the process of the invention, the method of the catalyst preparation also being indicated. The invention should not be considered as limited to this example of the process or to the particular catalyst preparation since these are merely given as illustrations of the novelty and utility of the invention.

A catalytic material was prepared by adding concurrently 250 cc. of water glass of 5 to 1 dilution and 4 N hydrochloric acid to 300 cc. of a solution containing 15 grams of ethylene diamine. During the addition of the water glass and hydrochloric acid the pH value was maintained at about 6.5. The precipitated hydrated silica was filtered and purified by washing it with acidified water having a pH value of 2 to free it of alkali metal ions.

The purified finely divided silica was suspended in a solution of aluminum chloride and hydrated alumina was precipitated by the addition of ammonium hydroxide so that 5 mols of alumina were present for each 100 mols of silica.

Silica-alumina catalyst in finely divided form when prepared according to the above procedures and admixed in the proportion of approximately one percent with a Pennsylvania distillate oil of approximately 35° A. P. I. gravity gives a yield of 27.4 volume percent of 400° F. end-point gasoline of 76.5 octane number in a once-through operation when heating to a temperature of approximately 1000° F. with a reaction chamber at approximately 800° F. and a pressure of 55 pounds per square inch. In a recycle operation where partly converted hydrocarbons of high boiling point range are recycled in admixture with further amounts of catalyst powder a yield of approximately 65% of 78 octane number may be obtained.

I claim as my invention:

1. A hydrocarbon conversion process which comprises subjecting a hydrocarbon to contact with a catalyst comprising finely divided hydrated silica produced by adding an acid to a solution of an alkali metal silicate containing an alkylene polyamine.

2. A hydrocarbon conversion process which comprises subjecting a hydrocarbon to contact with a catalyst comprising finely divided hydrated silica produced by adding an acid to a solution of an alkali metal silicate containig an alkylene polyamine hydrochloride.

3. A hydrocarbon conversion process which comprises subjecting a hydrocarbon to contact with a catalyst comprising finely divided hydrated silica produced by adding an acid to a solution of an alkali metal silicate containing an ethylene diamine.

4. A hydrocarbon conversion process which comprises subjecting a hydrocarbon to contact with a catalyst comprising finely divided hydrated silica produced by adding an acid to a solution of an alkali metal silicate containing diethylene triamine.

5. A hydrocarbon conversion process which comprises subjecting a hydrocarbon to contact with a catalyst comprising finely divided hydrated silica produced by adding an acid to a solution of an alkali metal silicate containing triethylene tetra-amine.

6. A process for the conversion of relatively high boiling hydrocarbons into gasoline which comprises subjecting said hydrocarbons to contact with a catalyst composite produced by adding an acid to a solution of an alkali metal silicate containing an alkylene polyamine to precipitate hydrated silica in finely divided condition and compositing said hydrated silica with a hydrated oxide selected from the group consisting of alumina, zirconia, and alumina and zirconia.

7. A process for the conversion of relatively high boiling hydrocarbons into gasoline which comprises subjecting said hydrocarbons to contact with a silica-metal oxide composite produced by adding an acid to a solution of an alkali metal silicate containing an alkylene polyamine to precipitate finely divided hydrated silica, combining said hydrated silica with a solution of a metal salt, adding an alkaline reagent to precipitate a hydrated oxide of said metal, separating a composite of hydrated silica and hydrated metal oxide, washing said last-named composite to remove soluble compounds therefrom and heating to remove water and produce said catalyst.

8. A process for the conversion of relatively high boiling hydrocarbons into gasoline which comprises subjecting said hydrocarbons to contact with a silica-alumina composite produced by adding an acid to a solution of an alkali metal silicate containing an alkylene polyamine to precipitate finely divided hydrated silica, combining said hydrated silica with a solution of an aluminum salt, adding an alkaline reagent to precipitate hydrated alumina, separating a composite of hydrated silica and hydrated alumina, washing said last-named composite to remove soluble compounds therefrom and heating to remove water and produce said catalyst.

9. A process for the conversion of relatively high boiling hydrocarbons into gasoline which comprises subjecting said hydrocarbons to contact with a silica-zirconia composite produced by adding an acid to a solution of an alkali metal silicate containing an alkylene polyamine to precipitate finely divided hydrated silica, combining said hydrated silica with a solution of a zirconium salt, adding an alkaline reagent to precipitate hydrated zirconia, separating a composite of hydrated silica and hydrated zirconia, washing said last-named composite to remove soluble compounds therefrom and heating to remove water and produce said catalyst.

10. A process for the conversion of relatively high boiling hydrocarbons into gasoline which comprises subjecting said hydrocarbons to contact with a silica-alumina-zirconia composite produced by adding an acid to a solution of an alkali metal silicate containing an alkylene polyamine to precipitate finely divided hydrated silica, combining said hydrated silica with a solution containing an aluminum salt and a zirconium salt, adding an alkaline reagent to precipitate hydrated alumina and hydrated zirconia, separating a composite of hydrated silica, hydrated alumina and hydrated zirconia, washing said last-named composite to remove soluble compounds therefrom and heating to remove water and produce said catalyst.

ELMER R. KANHOFER.